(12) United States Patent
Shifrin et al.

(10) Patent No.: US 8,581,430 B2
(45) Date of Patent: Nov. 12, 2013

(54) HYDRO TURBINE GENERATOR

(76) Inventors: Salvatore Shifrin, Windham, CT (US); Joseph Shifrin, Windham, CT (US)

( * ) Notice: Subject to any disclaimer, the term of this patent is extended or adjusted under 35 U.S.C. 154(b) by 87 days.

(21) Appl. No.: 13/402,097

(22) Filed: Feb. 22, 2012

(65) Prior Publication Data

US 2012/0146330 A1    Jun. 14, 2012

Related U.S. Application Data

(63) Continuation-in-part of application No. 12/217,336, filed on Jul. 3, 2008, now Pat. No. 8,125,096.

(60) Provisional application No. 60/958,368, filed on Jul. 5, 2007.

(51) Int. Cl.
| F01D 15/10 | (2006.01) |
| F02C 6/00 | (2006.01) |
| H02K 7/18 | (2006.01) |
| H02P 9/04 | (2006.01) |
| F03B 13/00 | (2006.01) |
| F03B 13/10 | (2006.01) |

(52) U.S. Cl.
USPC .......................................... 290/52; 290/43

(58) Field of Classification Search
USPC .................................................... 290/43, 52
See application file for complete search history.

(56) References Cited

U.S. PATENT DOCUMENTS

| 914,399 A | 3/1909 | Fancher | 408/78 |
| 2,132,504 A | 10/1938 | Whisler | 415/19 |
| 2,713,643 A | 7/1955 | Rheingans | 307/85 |
| 2,787,715 A | 4/1957 | Danel | 290/52 |
| 3,118,281 A | 1/1964 | Gros | 60/459 |
| 3,184,281 A | 5/1965 | Hochwalt et al. | 8/513 |
| 3,372,645 A | 3/1968 | Willi | 415/1 |
| 3,848,171 A | 11/1974 | Speth et al. | 318/561 |
| 4,143,990 A | 3/1979 | Atencio | 405/78 |
| 4,165,467 A | 8/1979 | Atencio | 290/52 |
| 4,182,123 A | 1/1980 | Ueda | 60/325 |
| 4,224,526 A | 9/1980 | Margison et al. | 290/52 |
| 4,278,895 A | 7/1981 | Cros | 290/52 |
| 4,279,539 A | 7/1981 | Gutierreza Atencio | 405/76 |
| 4,319,142 A | 3/1982 | Mayo, Jr. | 290/52 |
| 4,326,819 A | 4/1982 | Atencio | 405/78 |
| 4,345,159 A | 8/1982 | Gutierrez Atencio | 290/43 |

(Continued)

OTHER PUBLICATIONS

Anonymous. Servo Sprockets. ServoCity. Jan. 7, 2012. [retrieved on Apr. 8, 2013]. Retrieved from the Internet: (URL: http://web.archive.org/web/20120107045056/http://servocity.com/htm/servo_sprockets_1227_.html>, entire document.

(Continued)

*Primary Examiner* — Pedro J Cuevas
(74) *Attorney, Agent, or Firm* — MKG, LLC

(57) ABSTRACT

A hydroelectric turbine generator and control system is provided that optimizes the maximum possible power output at all times by strictly monitoring power output from the generator unit and modulating the wicket gate angle and the runner blade pitch independently of one another. The hydroelectric turbine generator includes a means for separately controlling wicket gate angle and runner blade pitch. The wicket gate angle control mechanism controls the flow into the system, pre conditions flow for maximum power and maintains reservoir level. The runner blade pitch control mechanism continuously monitors the system power output based on actual power produced, and adjusts system parameters in order to achieve maximum power output.

20 Claims, 7 Drawing Sheets

OVERVIEW

(56) References Cited

U.S. PATENT DOCUMENTS

| | | | |
|---|---|---|---|
| 4,437,017 A | 3/1984 | Osterberg | 290/52 |
| 4,467,216 A | 8/1984 | Murphy | 290/43 |
| 4,476,396 A | 10/1984 | Calvert, Jr. | 290/53 |
| 4,573,827 A | 3/1986 | Mayo, Jr. | 405/78 |
| 4,610,599 A | 9/1986 | Long | 415/15 |
| 4,629,904 A | 12/1986 | Rojo, Jr. et al. | 290/52 |
| 4,674,279 A | 6/1987 | Ali et al. | 60/398 |
| 4,754,155 A | 6/1988 | Obermeyer | 290/52 |
| 4,772,157 A | 9/1988 | Obermeyer | 405/75 |
| 4,787,815 A | 11/1988 | Weyh | 415/164 |
| 4,794,544 A | 12/1988 | Albright et al. | 700/287 |
| 4,991,397 A | 2/1991 | Varsa | 60/398 |
| 5,092,227 A | 3/1992 | Ahmed et al. | 454/61 |
| 5,115,728 A | 5/1992 | Ahmed et al. | 454/61 |
| 5,170,673 A | 12/1992 | Ahmed et al. | 73/865.9 |
| 5,228,830 A | 7/1993 | Pastore | 415/200 |
| 5,322,412 A | 6/1994 | Erlach | 415/1 |
| 5,441,384 A | 8/1995 | Gokhman | 415/161 |
| 5,470,275 A | 11/1995 | Jacob et al. | 454/61 |
| 5,754,446 A | 5/1998 | Fisher, Jr. et al. | 700/287 |
| 5,905,311 A | 5/1999 | Hess et al. | 290/52 |
| 6,325,570 B1 | 12/2001 | Pohjamo | 405/81 |
| 6,546,723 B1 | 4/2003 | Watten et al. | 60/398 |
| 6,658,634 B1 | 12/2003 | Goodnow et al. | 716/103 |
| 6,832,578 B2 | 12/2004 | Odeh | 119/219 |
| 7,084,521 B1 | 8/2006 | Martin | 290/54 |
| 7,114,918 B2 | 10/2006 | Coulson et al. | 415/163 |
| 7,308,586 B2 | 12/2007 | Oshins et al. | 713/300 |
| 7,313,708 B2 | 12/2007 | Oshins et al. | 718/300 |
| 7,412,609 B2 | 8/2008 | Oshins et al. | 713/300 |
| 7,478,974 B1 | 1/2009 | Kelly | 405/78 |
| 7,577,856 B2 | 8/2009 | Oshins et al. | 713/300 |
| 7,579,703 B2 | 8/2009 | Shifrin | 290/52 |
| 7,973,594 B2 | 7/2011 | Amrutur et al. | 327/544 |
| 8,011,854 B1 | 9/2011 | Millard | 405/83 |
| 8,024,927 B1 | 9/2011 | Azizi et al. | 60/496 |
| 8,072,089 B2 * | 12/2011 | Krouse et al. | 290/54 |
| 8,125,096 B2 * | 2/2012 | Shifrin et al. | 290/52 |
| 2002/0185078 A1 | 12/2002 | Odeh | 119/215 |
| 2004/0115048 A1 | 6/2004 | Kuwabara | 415/204 |
| 2005/0246556 A1 | 11/2005 | Oshins et al. | 713/300 |
| 2005/0246560 A1 | 11/2005 | Oshins et al. | 713/300 |
| 2005/0246719 A1 | 11/2005 | Oshins et al. | 719/318 |
| 2007/0140829 A1 | 6/2007 | Maillard de la Morandais | 415/4.1 |
| 2008/0290663 A1 | 11/2008 | Shifrin | 290/52 |
| 2009/0021011 A1 * | 1/2009 | Shifrin et al. | 290/43 |
| 2009/0119233 A1 | 5/2009 | Dunagan et al. | 705/412 |
| 2009/0134623 A1 * | 5/2009 | Krouse | 290/43 |
| 2010/0181771 A1 | 7/2010 | Roos | 290/52 |
| 2011/0115228 A1 | 5/2011 | Stothers et al. | 290/52 |
| 2012/0292907 A1 * | 11/2012 | Krouse | 290/52 |

OTHER PUBLICATIONS

International Search Report for corresponding PCT Application No. PCT/US2013/027051 dated Apr. 26, 2013.

\* cited by examiner

12(a). RUNNER ANGLE SERVO
12(b). RUNNER ANGLE MECHANISM
12(c). RUNNER
12(d). WICKET SERVO/GEARBOX
12(e). WICKET ANGLE MECHANISM
12(f). WICKET GATE
12(g). GENERATOR DRIVE SHAFT
12(h). DRIVE SHAFT TO GENERATOR SPEED REDUCTION

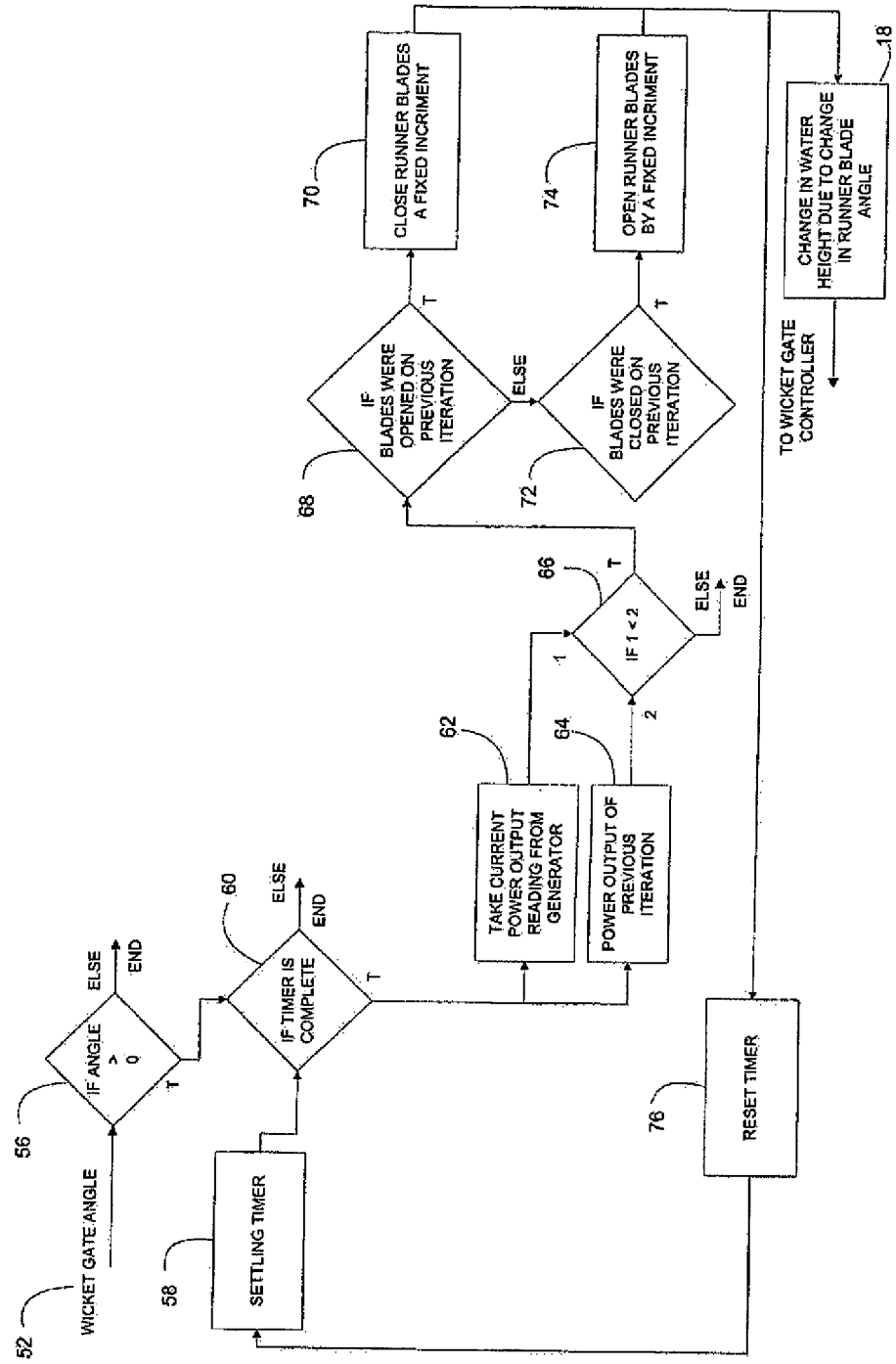

HYDRO TURBINE GENERATOR

CROSS-REFERENCE TO RELATED APPLICATION

This application is a Continuation-In-Part of U.S. patent application Ser. No. 12/217,336 filed on Jul. 3, 2008, and now U.S. Pat. No. 8,125,096; and this application claims the benefit of U.S. Provisional Application No. 60/958,368 filed Jul. 5, 2007; both applications of which are incorporated herein in their entirety.

BACKGROUND OF THE INVENTION

1. Field of the Invention

The present invention generally relates to a system and apparatus for generating electrical power. More specifically, this invention is directed to a hydroelectric turbine generator and computer based control system. The hydroelectric turbine generator can be installed and operated in low head, high volume "run of the river" hydroelectric sites throughout the world.

The hydroelectric turbine is specifically designed for small hydro applications and is not a "scaled down" larger turbine. The hydroelectric turbine takes advantage of the current state of the art technology, and applies it in the most appropriate manner for currently underutilized small hydro power sites. In Connecticut, Massachusetts and New York alone, there are 4,100 registered dams. Of these registered dams, approximately 350 are used for hydro power generation. There are approximately 3,750 undeveloped potential hydro power sites in this small region. In many cases, these are former mill sites with a prior history of hydro power production. There are an endless number of potential clean renewable power generating sites throughout the world, which can be developed using the present invention. Some of these sites are not former mill sites, are not registered dams and are currently considered to be not cost justifiable.

The present invention and technology will allow a vast, untapped, clean renewable power generating potential to be developed and utilized in a cost justified manner. Moreover, a hydroelectric turbine according to the present invention will open significant power production opportunities for other portions of the world including, "third world country" applications where the cost and complexities of current hydro equipment have made it difficult or impossible to consider.

2. Brief Description of the Related Art

Hydroelectric power generation is well known in the prior art. U.S. Pat. No. 4,674,279 to Ali, et al. (hereinafter, "the '279 patent") discloses a control system for a hydroelectric power plant of the run-of-river type wherein the load on the turbine generator unit(s) are matched to the flow of the river. The unit(s) operate at the maximum head available for existing flow conditions to produce the maximum energy available from the river flow for the installed capacity of the plant and within the allowable, safe operating capability range of the turbine-generator unit(s). The control system can be employed with a plurality of turbine-generator units in a hydroelectric power plant.

As disclosed in the '279 patent, the turbine has a main housing and runner. Supply of water to the runner is controlled by wicket gates. The flow control means includes flow controls or modulating devices (wicket gates, runner blades or nozzles). The flow control means, or wicket gate position sensing, provides a signal indicative of the actual position of the flow control or wicket gates. The control system operates to cause either: (i) the opening of the flow control means or wicket gates to increase operation of turbine; or (ii) the closing of the flow control means or wicket gates to decrease operation of turbine. The control system automatically operates in response to variations in flow or in response to river conditions.

Other prior art discloses additional types of "Kaplan" style hydraulic turbines and control systems related to controlling the pitch of the runners and/or wicket gates. For example, U.S. Pat. No. 5,441,384 to Gokhman specifically describes a plurality of angles and a plurality of arrangements for wicket gates and blade runners. U.S. Pat. No. 4,610,599 to Long describes a control system for a hydraulic "Kaplan" turbine. More specifically this patent provides a method of control for adjustable wicket gates and adjustable blade runners in a hydraulic turbine.

U.S. Pat. No. 5,322,412 to Erlach (hereinafter, "the '412 patent") and U.S. Pat. No. 5,754,446 to Fisher, Jr. (hereinafter, "the '446 patent") describe a method for optimizing the controls of hydraulic "Kaplan" turbines. The '412 patent describes the use of adjustable wicket gates and runners to optimize performance. The control system senses fluctuations in bearing pressure and/or generator AC output to change wicket gate and runner angles. Similarly, the '446 patent describes the use of various sensors to control the adjustment of wicket gate and runner angles thereby optimizing the performance of the turbine.

None of these prior art disclosures provide a specifically designed hydroelectric turbine for use in small, micro or mini-hydro applications. Also, in the prior art, the relationship between the wicket gates and runner blades is dependent; the runner blade position is directly controlled by the wicket gate position rather than truly optimizing runner blade angle for maximum power output. Moreover, such prior art devices do not provide for a pre-conditioned flow by the wicket gate for optimal performance of the runner blade.

It is therefore an object of the present invention to overcome these limitations in the prior art and to provide a hydroelectric turbine specifically designed for small hydro applications. It is also an object of the present invention to provide a means for independently controlling wicket gates and runner blades to achieve optimal power generation. Similarly, it is an object of the present invention to provide a means for pre-conditioning the flow to the runner blades by the wicket gates to achieve optimal power generation.

DESCRIPTION OF THE INVENTION

The present invention is designed for low head, high flow volume sites. The hydroelectric turbine comprises a double regulated propeller and utilizes the Kaplan turbine and gate system to produce electrical power efficiently through a wide range of flows common in "run of the river systems". The hydroelectric turbine is designed to operate at efficiency levels greater than 90%, and can handle flows as low as 20 cfs. The total unit output flexibility is typically between 100 kw and 700 kw.

A hydroelectric turbine in accordance with the present invention can run on or off of a power grid; is modular in design, therefore multiple units can be operated in series; has the ability to alternate between the primary turbine and a series of turbines; and comprises a means for automatic recognition and synchronization when using multiple units.

The present invention comprises an integrated self-contained computer based control system. The closed looped control software modulates both wicket gate and blade positions based on actual generator power output. The software program implements continuous searching capabilities for optimized power output starting with an initial wicket gate-to-blade position relationship. The program then utilizes a search-and-fine-tune algorithm to optimize peak operational efficiency based on runner blade angle and actual power output independent of wicket blade angle.

In a typical embodiment of the present invention, no hydraulic systems are required. Instead, all actuations, including runner blade angle and wicket gate angle, are achieved through servo motors and mechanical devices. The variable wicket gate blade angles and the rotating running blade angles are independent of one another allowing the wicket gate blades to pre-condition flow to the runner blades for maximum power production.

Rotational speed reduction is accomplished through the use of timing belts instead of an oil filled gear box. This eliminates the need for hydraulic or lubrication oil reservoirs located in close proximity to the water source and allows for simplified maintenance.

BRIEF DESCRIPTION OF THE DRAWINGS

FIG. 7 provides a flow diagram of a runner blade control means according to the present invention.

DETAILED DESCRIPTION OF THE INVENTION

Typically, the present invention comprises one or more hydroelectric Kaplan turbine generators. Each Kaplan turbine generator utilizes a plurality of fixed wicket gate blades and a plurality of rotating runner blades rotating along an axis. Wicket gates are a key component in hydroelectric turbines that control the flow of water from the input pipes to the turbine propellers or runner blades. Typically, wicket gates do not pre-condition the flow of water prior to contacting the runner blades because of their dependent relationship to the runner blades, physical location with the turbine, and because they are used to maintain reservoir level.

Figure 1:
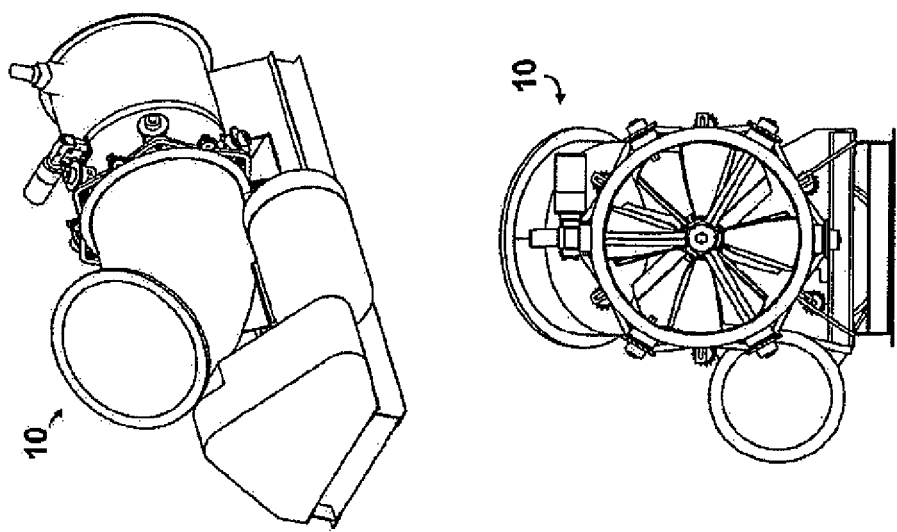
FIG. 1. illustrates top, isometric, side, and water exit views of a hydroelectric turbine unit in accordance with the present invention.
Figure 1:
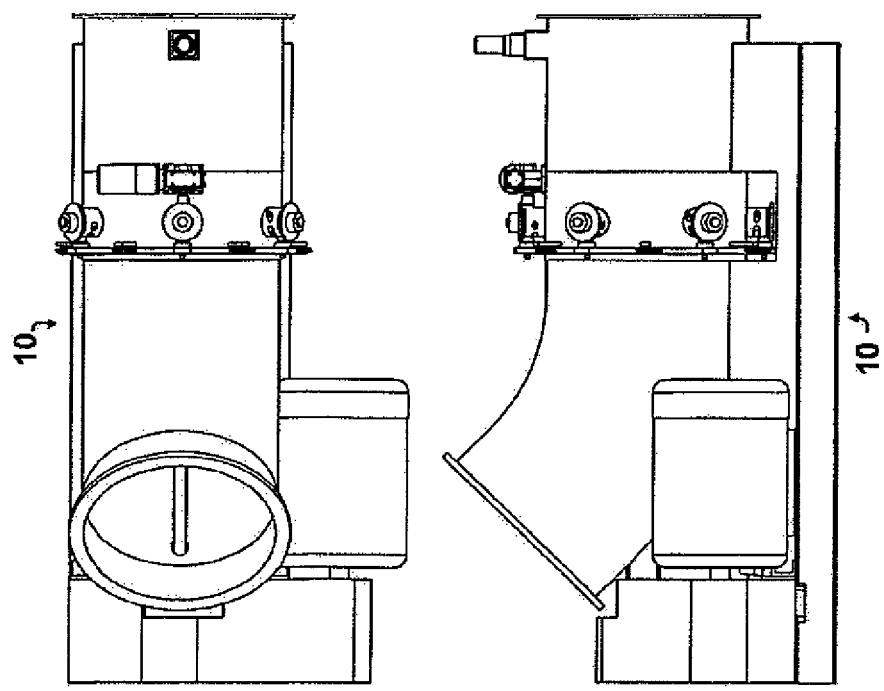
Figure 2:
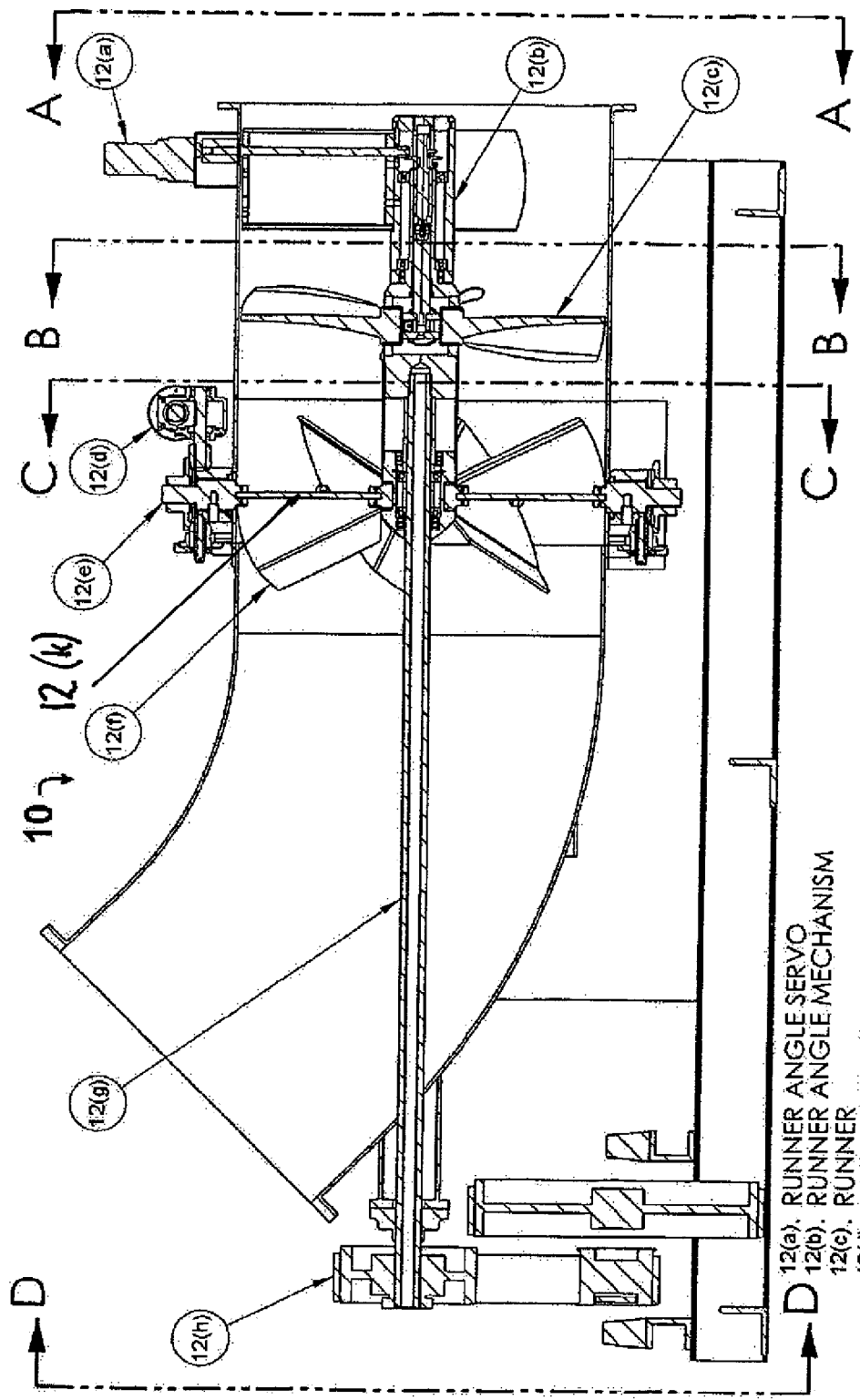
FIG. 2. illustrates a cross-sectional side view of the hydroelectric turbine unit of FIG. 1 with greater detail on individual components and systems.

Top, isometric, side, and water exit views of a hydroelectric turbine unit 10 in accordance with the present invention are depicted in FIG. 1. A cross-sectional side view of hydroelectric turbine unit 10 is provided in FIG. 2. As shown in FIG. 2, the unit features comprise a runner angle servo 12(a), a runner angle mechanism 12(b), and a runner 12(c). The unit features further comprise a wicket servo/gearbox 12(d), a wicket angle mechanism 12(e), and a wicket gate 12(f). As further shown in FIG. 2, the unit comprises a generator drive shaft 12(g) and a drive shaft-to-generator speed reduction means 12(h).

Figure 3:
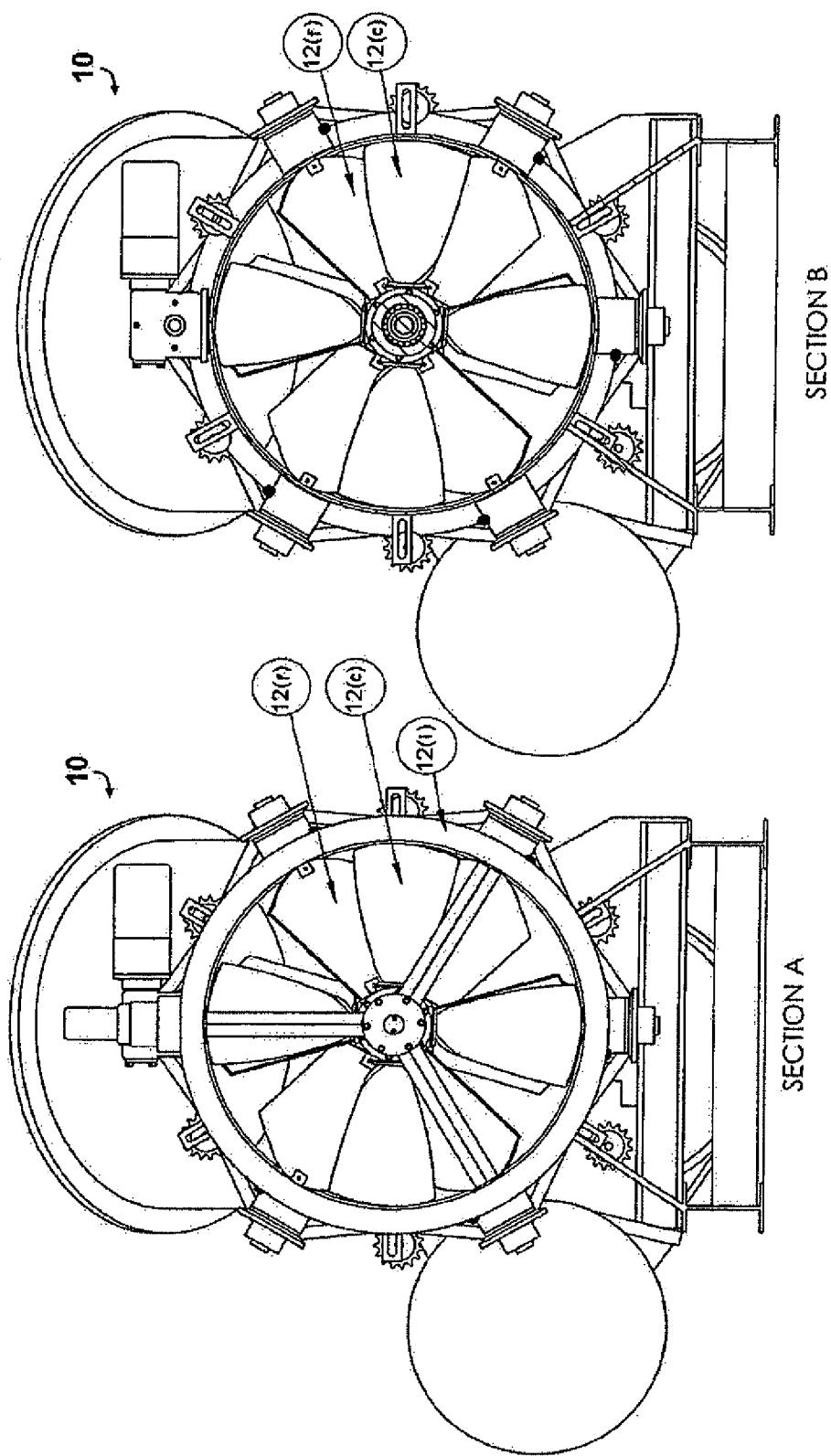
FIG. 3 provides sectional views taken along Section A and Section B of FIG. 2. Section A depicts the water exit end of the hydroelectric turbine and Section B depicts a cross-sectional cut into the runner angle mechanism.

As shown in FIG. 3, Section A depicts the water exit end 12(i) of the hydroelectric turbine and Section B depicts a cross-sectional cut into the runner angle mechanism. Rotationally mounted runners 12(c) and fixedly mounted wicket gate 12(f) are shown in both sectional views. Each fixedly mounted wicket gate 12(f) also provides support 12(k) thereby supporting runners 12(c) and other rotating components, bearings, and or bearing housings along generator drive shaft 12(g). Thus, the present invention does not require the use of additional support structure, such as struts, which impede the efficiency of a typical power generation system.

Figure 4:
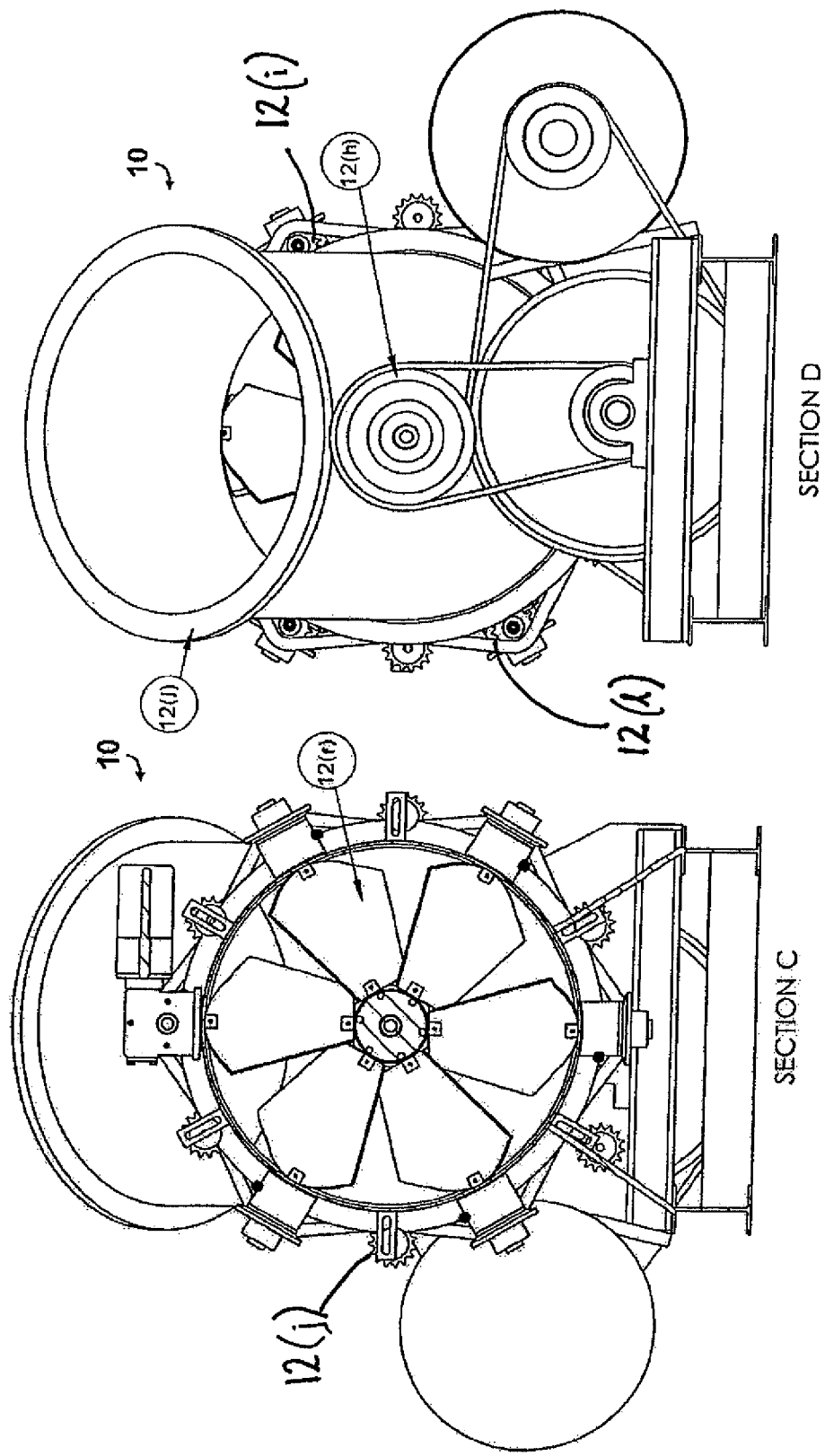
FIG. 4 provides sectional views taken along Section C and Section D of FIG. 2. Section C depicts a cross-sectional cut between the wicket gate and the runner of the hydroelectric turbine and Section D depicts the water entrance end of the hydroelectric turbine and the drive shaft-to-generator speed reduction system.

As shown in FIG. 4, Section C depicts a cross-sectional cut between the wicket gate 12(f) and the runner 12(c) of the hydroelectric turbine 10 and Section D depicts the water entrance end 12(c) of the hydroelectric turbine 10 and the drive shaft-to-generator speed reduction system 12(h). Wicket servo/gearbox 12(d) provides for the drive and adjustment of each wicket gate 12(f) via a mechanical drive chain and sprocket system comprising a wicket drive sprocket 12(i) for each wicket gate 12(f), an idler sprocket 12(j) positioned between wicket drive sprockets 12(i), and a chain 12(l) in mechanical communication with wicket drive sprockets 12(i), an idler sprockets 12(j), and wicket servo/gearbox 12(d). While a mechanical drive chain and sprocket system has been shown and described for adjusting a wicket gate, the present invention is not limited in this regard as other means for adjusting a wicket gate, such as, but not limited to, a belt drive and spindle system, may be substituted without departing from the broader aspects of the present invention. Moreover, the mechanical drive chain and sprockets system and alternative embodiments described herein for providing for the drive and adjustment of each wicket gate also may be used for providing for the drive and adjustment of each runner blade.

A preferred embodiment of the present invention comprises a stationary wicket gate arrangement with independent relationship to the rotating runner blades. The independence of the wicket gate to the runner blades allows for pre-conditioning of the flow of water prior to contact with the runner blades. The wicket gate can be set for various runner blade angles as determined by a control means. Formerly, each wicket gate angle cooperated with a preset runner blade angle such that a change in the wicket gate automatically changed the runner angle to the same preset condition. The present invention provides for the independent control of the wicket gate such that its angle adjusts to maintain reservoir level and to pre-condition the flow of water thus allowing the runner blades to independently, as determined by a control means, achieve optimal power output.

A preferred embodiment of the present invention further comprises a means for converting torque and angular velocity to a power output such as torque converter to precisely control a variable speed propeller and a fixed speed generator. Accordingly, the propeller of the present invention can be managed to run at the most efficient speed for any given operating conditions thereby generating optimum torque while permitting the power generated to be fed back into the power grid (typically, 50-60 Hz). The hydroelectric turbine generator control system employs a series of controllers and sensors to measure operating conditions and automatically fine-tune the overall system through a number of feedback loops. Some operating parameters controlled by the control system include: inlet volume and direction; variable wicket gate angles; variable runner blade propeller pitch; target elevation of the source of flow; the system flow rates; and other standard hydroelectric generator controls.

Figure 5:
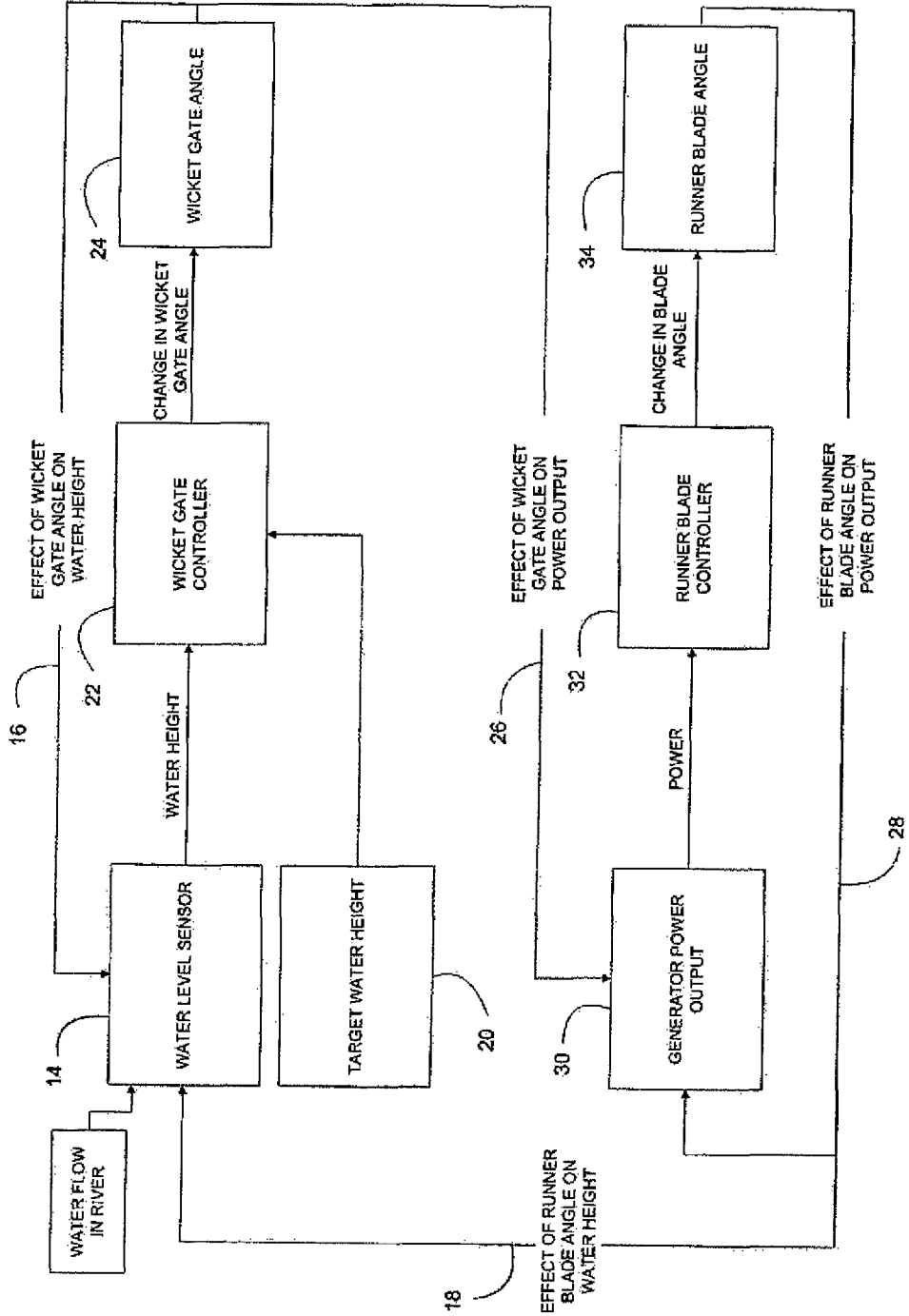
FIG. 5 provides an overview flow diagram of a power generation control means according to the present invention.

A power output control means according to the present invention is described via a flowchart in FIG. 5. A water level sensor 14 obtains a reading of water height in the reservoir. The water height is resultant of: (i) the amount of volumetric flow in the river; and (ii) the amount of volumetric flow that is allowed through the hydroelectric turbine 10. The amount of volumetric flow that is allowed through the hydroelectric turbine 10 is the effect of wicket gate angle 16 and runner blade angle 18 on total volumetric water flow through the system. The water height reading from the water level sensor 14 and the target water height 20 are then passed to the wicket gate controller 22. The wicket gate controller 22 then determines the appropriate adjustment in wicket gate angle 24 to obtain the target water height 20.

Theoretical power output of a "run of the river" hydroelectric turbine can be calculated by the equation:

$$P = g * Q * H * e$$

Where P is power in kilowatts, g equals the gravitational constant which is approximately 9.81 meters per second squared, Q is the volumetric flow through the system in cubic meters per second, H is the pressure head in meters, and e is the efficiency rating of the hydroelectric turbine unit. Therefore, it is evident that as the position of the wicket gates and the runner blades change and have an effect on the flow through the hydroelectric turbine; and they also have a substantial effect on the power output of the generator.

These effects are illustrated in FIG. 5 by the effect of wicket gate angle on power output 26 and the effect of runner blade angle on power output 28. A reading of the actual (not theoretical) power output from the generator 30 is then passed to the runner blade controller 32 which makes a decision for the appropriate change in runner blade angle to increase power output. The runner blade controller 32 then sets the runner blade angle 34 restarting the runner blade control loop. While a generator has been shown and described as a means for converting torque and angular velocity to a power output, the present invention is not limited in this regard as other means for converting torque and angular velocity to a power output, such as, but not limited to, electrical current generating and measurement devices (measuring any one of a number of electrical current elements via an electrical current meter), mechanical power conversion and measurement devices (e.g., a dynamometer), and flow conversion and measurement devices (measuring the flow from a pump or other fluid pumping device) may be substituted without departing from the broader aspects of the present invention.

Figure 6:
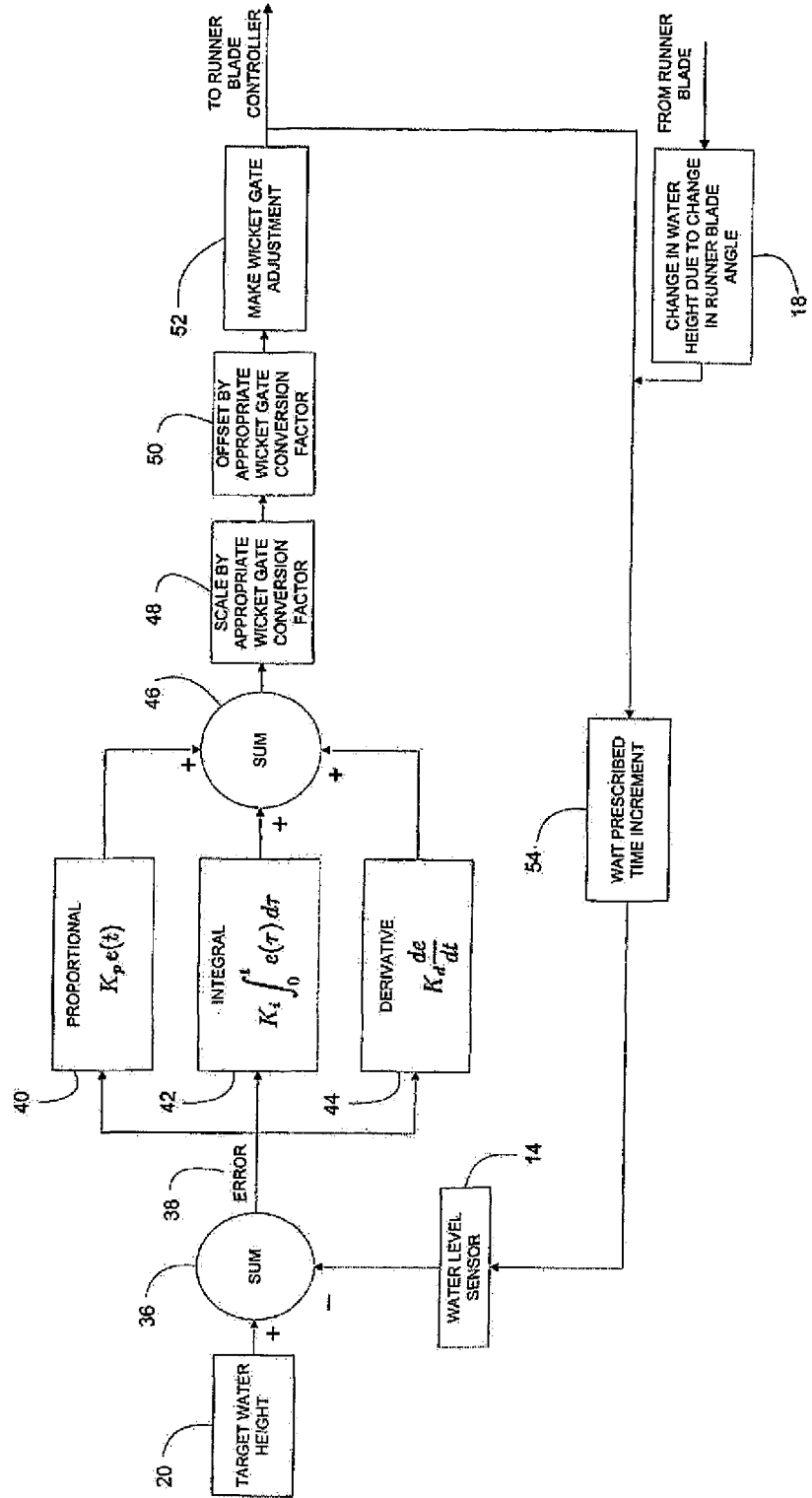
FIG. 6 provides a flow diagram of a wicket gate control means according to the present invention.

FIG. 6 embodies the wicket gate controller 22 in greater detail. The wicket gate control loop represents a standard parallel Proportional-Integral-Derivative ("PID") control loop. The loop begins by taking a set point, which in this case is the target water height 20 and subtracting the actual water height (recorded from the water level sensor 14) in the summation block 36 to find the system error 38. The error 38 is then passed to each of the three elements of the PID control. The first element, the proportional term 40 is described by the equation:

$$P_{out} = K_p e(t)$$

Where $P_{out}$ is the determined proportional change needed to correct the error 38 in the system, $K_p$ is the proportional gain coefficient which is a scaling factor to regulate the effect of the proportional term on the system, and e(t) is the measured error as a function of time. The proportional term of the PID loop primarily accounts for the magnitude of the error in the system.

The second element of the PID control loop is the integral element 42 which is described by the equation:

$$I_{out} = K_i \int_0^t e(\tau) d\tau$$

Where $I_{out}$ is the determined change necessary to correct the error with respect to the integral of the error in the system, $K_i$ is the integral coefficient which is a scaling factor to regulate the effect of the integral term on the system, the integral term consists of the integration of the error from time zero to a prescribed time limit. The integral element of the PID control loop accounts for the amount of time that an error exists and therefore makes an appropriate adjustment.

The final element of the PID portion of the wicket gate control is the derivative term 44 which is best described by the equation:

$$D_{out} = K_d \frac{de}{dt}$$

Where $D_{out}$ is the determined correction for the error in the system based on the derivative of the error, $K_d$ is the derivative coefficient which is a scaling factor to regulate the effect of derivative term on the system, and de/dt is the derivative of the error with respect to time. The derivative term of the PID control loop accounts for the rate at which the water height approaches the target water height to avoid overshooting or undershooting the target.

The prescribed corrections from each of the three elements of the PID control portion of the wicket gate control are then summed up 46 to produce the total necessary correction to the system to obtain the target water height 20. The determined correction in water height is then conditioned to apply to the wicket gate by multiplying by a scaling factor 48 and adding an offset factor 50 to bring the correction into an appropriate range for the wicket gate angles 52. The adjustment in wicket gate angle is then made 52. As a safety precaution, the wicket gate controller 22 then sends a signal to the runner blade controller 32 indicating the current wicket gate position 52. In the case that the wicket gates are closed, the runner blade controller 32 will take no action. The wicket gate controller 22 then allows for a prescribed time increment 54 to pass before taking another water height reading, therefore beginning the process again.

FIG. 7 illustrates a detailed view of the runner blade control 32. The runner blade control 32 first takes consideration to the wicket gate angle 52; this consideration only bears on the actions of the runner blade in the singular condition that the wicket gates are closed. This consideration is to prevent excessive runner blade searching. If the wicket gate angle 52 is greater than zero (not fully closed) 56 then the runner blade control loop 32 continues the control process. The controller then recognizes the settling timer 58 to prevent a condition of system-chasing where the control system does not allow the physical hydroelectric turbine system to stabilize, causing unwanted and incorrect changes. If the condition of timer completion is met 60 then the control loop is allowed to proceed.

While the wicket gate control loop has been shown and described as a standard parallel Proportional-Integral-Derivative control loop, the present invention is not limited in this regard as other types of closed loop control methods that measure output, provide feedback, and make adjustments based upon such feedback, such as, but not limited to, a Proportional control loop, a Proportional-Integral control loop, a Bi-stable control loop, a Hystoretic control loop, and a Programmable Logic Control unit may be substituted without departing from the broader aspects of the present invention.

The system then obtains the current power output reading from the generator 62 and compares it with the power output of the generator obtained on the previous iteration 64. If the current power generated is less than the power generated on the previous iteration the loop proceeds 66, otherwise, if the power generated has increased from the previous iteration, no change is made in the system and the loop is reinitialized. If the loop proceeds, the system then pays consideration to the action taken on the previous iteration. If the runner blades were opened a fixed increment on the previous iteration 68 then the runner blades are closed a fixed increment on the current iteration 70. If the runner blades were closed a fixed increment on the previous iteration 72 then the runner blades are opened a fixed increment on the current iteration 74. The settling timer is then reset 76 to allow for the physical system to stabilize due to the change in water height with respect to the change in runner blade angle 18. The runner blade control loop 32 then begins again.

Another embodiment of a hydroelectric turbine unit in accordance with the present invention comprises a self-contained unit incorporating fully integrated systems including all of the turbine components, the wicket and runner actuators, the generator or other power adapting device, the speed reduction drive, and all other system components provided on one integrated and easily mounted containment.

As stated hereinabove, a hydroelectric turbine unit in accordance with the present invention comprises an integrated self-contained computer based control system or module. A power generation system may comprise a plurality of hydroelectric turbine units wherein each unit respectively comprises an integrated self-contained computer based control module. In typical power generation systems comprising multiple power generation units, each unit is brought online in series: Unit No. 1 is brought online; when Unit No. 1 reaches its maximum operating rating, Unit No. 2 is brought online; and when Unit No. n reaches its maximum operating rating, Unit No. n+1 is brought online. A power generation system comprising a plurality of hydroelectric turbine units wherein each unit respectively comprises an integrated self-contained computer based control module, and each integrated self-contained computer based control module is in communication with one or more other modules, provides for the following:
  i. daisy-chain connection and communication between multiple units;
  ii. cycling multiple units online and off line based on available flow;
  iii. detection of "out of service" units and subsequent automatic compensation for available flows and optimized power generation via the remaining units;
  iv. monitoring of individual unit performance including detection of "out of limits" performance and subsequent adjustment to remaining units; and
  v. distribution of wear based on total operational time and performance of each individual unit, with automatic adjustment to sequencing of all units to distribute operational time and subsequent wear and tear.

Although the invention has been described in considerable detail with respect to particular embodiments of Applicant's device, it will be apparent that the invention is capable of numerous modifications and variations, apparent to those skilled in the art, without departing from the spirit and scope of the invention.

The invention claimed is:

1. A hydroelectric turbine generator comprising:
   a) an inlet;
   b) a plurality of wicket gates;
   c) a wicket gate angle adjustment mechanism;
   d) a plurality of runner blades;
   e) a runner blade pitch adjustment mechanism;
   f) a means for converting torque and angular velocity to a power output;
   g) a control loop capable of (i) calculating a difference between a target water source height and an actual water source height, and (ii) calculating a wicket gate angle adjustment and a runner blade pitch adjustment;
   h) a power optimization algorithm capable of optimizing peak operational efficiency based on a runner blade angle and the power output;
   i) an electronic means capable of (i) an electronic process comprising storing and executing the control loop, and (ii) a mechanical process comprising instructing the wicket gate angle adjustment mechanism to adjust the wicket gate angle; and
   (j) an electronic means capable of (i) an electronic process comprising storing and executing the power optimization algorithm, and (ii) a mechanical process comprising instructing the runner blade pitch adjustment mechanism to adjust the runner blade pitch.

2. The hydroelectric turbine generator of claim 1 wherein the runner blade pitch adjustment mechanism further comprises a control loop for measuring the power output.

3. The hydroelectric turbine generator of claim 2 wherein the control loop for measuring the power output calculates an increase or a decrease in the power output.

4. The hydroelectric turbine generator of claim 3 wherein the increase or decrease in the power output is passed to the runner blade pitch adjustment mechanism.

5. The hydroelectric turbine generator of claim 4 wherein the wicket gate angle adjustment mechanism and the runner blade pitch adjustment mechanism comprise servo motors.

6. The hydroelectric turbine generator of claim 5 wherein the wicket gate angle servo motor adjusts the wicket gate angle based upon the control loop.

7. The hydroelectric turbine generator of claim 6 wherein the runner blade pitch servo motor adjusts the runner blade pitch based upon the power optimization algorithm.

8. The hydroelectric turbine generator of claim 6 wherein the runner blade pitch servo motor adjusts the runner blade pitch based upon the increase or decrease in the power output.

9. The hydroelectric turbine generator of claim 1 wherein the control loop comprises a Proportional control loop.

10. The hydroelectric turbine generator of claim 1 wherein the control loop comprises a Proportional-Integral control loop.

11. The hydroelectric turbine generator of claim 1 wherein the control loop comprises a Bi-stable control loop.

12. The hydroelectric turbine generator of claim 1 wherein the control loop comprises a Hystoretic control loop.

13. The hydroelectric turbine generator of claim 1 wherein the control loop comprises a Programmable Logic Control unit.

14. The hydroelectric turbine generator of claim 1 wherein at least one of the plurality of wicket gates supports a plurality of rotating components.

15. The hydroelectric turbine generator of claim 1 wherein the mechanical process comprising instructing the wicket gate angle adjustment mechanism to adjust the wicket gate angle comprises a mechanical drive chain and sprocket system.

16. The hydroelectric turbine generator of claim 1 wherein the means for converting torque and angular velocity to a power output comprises an electrical current generating and measurement device.

17. The hydroelectric turbine generator of claim 1 wherein the means for converting torque and angular velocity to a power output comprises a mechanical power conversion and measurement device.

18. The hydroelectric turbine generator of claim 1 wherein the means for converting torque and angular velocity to a power output comprises a flow conversion and measurement device.

19. The hydroelectric turbine generator of claim 1 wherein the hydroelectric turbine generator comprises a self-contained unit.

20. A power generation system comprising a plurality of hydroelectric turbine generators wherein each hydroelectric turbine generator comprises:
   a) an inlet;
   b) a plurality of wicket gates;
   c) a wicket gate angle adjustment mechanism;
   d) a plurality of runner blades;
   e) a runner blade pitch adjustment mechanism;
   f) a means for converting torque and angular velocity to a power output;
   g) a control loop capable of (i) calculating a difference between a target water source height and an actual water source height, and (ii) calculating a wicket gate angle adjustment and a runner blade pitch adjustment;
   h) a power optimization algorithm capable of optimizing peak operational efficiency based on a runner blade angle and the power output;
   i) an electronic means capable of (i) an electronic process comprising storing and executing the control loop, and (ii) a mechanical process comprising instructing the wicket gate angle adjustment mechanism to adjust the wicket gate angle;
   (j) an electronic means capable of (i) an electronic process comprising storing and executing the power optimization algorithm, and (ii) a mechanical process comprising instructing the runner blade pitch adjustment mechanism to adjust the runner blade pitch; and
   (k) an integrated self-contained computer based control module wherein at least one integrated self-contained computer based control module is in communication with at least one other integrated self-contained computer based control module.

* * * * *